United States Patent
Gursha et al.

(10) Patent No.: US 12,141,219 B2
(45) Date of Patent: Nov. 12, 2024

(54) SYSTEMS AND METHODS FOR AUTOMATIC RESOURCE REPLACEMENT

(71) Applicant: Point Curve, Inc., Syracuse, NY (US)

(72) Inventors: Michael Gursha, Chappaqua, NY (US); Douglas Gursha, Chappaqua, NY (US)

(73) Assignee: POINT CURVE, INC., Syracuse, NY (US)

(*) Notice: Subject to any disclaimer, the term of this patent is extended or adjusted under 35 U.S.C. 154(b) by 0 days.

(21) Appl. No.: 18/448,820

(22) Filed: Aug. 11, 2023

(65) Prior Publication Data

US 2023/0385359 A1 Nov. 30, 2023

Related U.S. Application Data

(63) Continuation of application No. 18/309,447, filed on Apr. 28, 2023, now Pat. No. 12,013,914, which is a continuation of application No. 17/656,187, filed on Mar. 23, 2022, now Pat. No. 11,669,582.

(60) Provisional application No. 63/165,681, filed on Mar. 24, 2021.

(51) Int. Cl.
   *G06F 17/00* (2019.01)
   *G06F 16/955* (2019.01)
   *G06F 16/958* (2019.01)
   *G06F 40/134* (2020.01)

(52) U.S. Cl.
   CPC ........ *G06F 16/9566* (2019.01); *G06F 16/958* (2019.01); *G06F 40/134* (2020.01)

(58) Field of Classification Search
   CPC .. G06F 16/9566; G06F 16/958; G06F 16/955; G06F 40/134
   See application file for complete search history.

(56) References Cited

U.S. PATENT DOCUMENTS

| | | | |
|---|---|---|---|
| 6,151,624 A | 11/2000 | Teare et al. | |
| 9,203,720 B2* | 12/2015 | Seolas | G06F 11/3692 |
| 9,582,596 B2* | 2/2017 | Amsterdam | G06F 16/9566 |
| 10,713,329 B2* | 7/2020 | Cowe | G06F 16/986 |
| 11,514,127 B2* | 11/2022 | Mahadik | G06F 16/338 |
| 2007/0168465 A1 | 7/2007 | Toppenberg et al. | |

(Continued)

FOREIGN PATENT DOCUMENTS

| | | | | |
|---|---|---|---|---|
| WO | WO-2012069803 A1 * | 5/2012 | ....... | G06F 17/30876 |
| WO | WO-2018106717 A1 * | 6/2018 | ......... | G01C 21/3673 |

(Continued)

OTHER PUBLICATIONS

"Styling Broken Images," Bits of Code Website, Available Online at https://bitsofco.de/styling-broken-images/, Mar. 8, 2016.

(Continued)

*Primary Examiner* — Laurie A Ries
(74) *Attorney, Agent, or Firm* — McCoy Russell LLP

(57) ABSTRACT

Systems and methods are provided for automatic resource replacement in web pages. In one embodiment, a method comprises using a machine learning model to select a replacement resource for a broken resource, in response to a presence of the broken resource in a first web page. The machine learning model may be trained to identify the replacement resource based on similarity in characteristics. In this way, resource errors may be mitigated in real-time and user experience of accessing web pages is improved.

19 Claims, 8 Drawing Sheets

(56) References Cited

U.S. PATENT DOCUMENTS

| | | | |
|---|---|---|---|
| 2008/0104633 A1 | 5/2008 | Noblecourt et al. | |
| 2008/0263193 A1 | 10/2008 | Chalemin et al. | |
| 2009/0094137 A1 | 4/2009 | Toppenberg et al. | |
| 2009/0240638 A1* | 9/2009 | Kirpal | G06F 16/9566 707/999.107 |
| 2010/0070448 A1 | 3/2010 | Omoigui | |
| 2010/0107091 A1* | 4/2010 | Amsterdam | G06F 16/958 715/760 |
| 2010/0293221 A1 | 11/2010 | Sidman et al. | |
| 2012/0047161 A1* | 2/2012 | Moadus | G06F 16/958 707/769 |
| 2012/0259832 A1 | 10/2012 | Walker et al. | |
| 2013/0019028 A1 | 1/2013 | Myers et al. | |
| 2013/0024444 A1* | 1/2013 | Stephens | G06F 16/248 707/E17.008 |
| 2014/0033019 A1* | 1/2014 | Zhang | G06F 16/986 715/234 |
| 2014/0172839 A1* | 6/2014 | Christoph | G06F 16/9566 707/726 |
| 2014/0181633 A1* | 6/2014 | Mo | G06F 16/958 715/234 |
| 2015/0193389 A1 | 7/2015 | Rose | |
| 2018/0329967 A1 | 11/2018 | Lee et al. | |
| 2019/0005154 A1* | 1/2019 | Tripathi | G06F 18/217 |
| 2019/0197077 A1* | 6/2019 | Li | H04L 69/329 |
| 2019/0236102 A1 | 8/2019 | Wade et al. | |
| 2019/0266288 A1* | 8/2019 | Shukla | G06F 16/9535 |
| 2020/0272679 A1* | 8/2020 | Mahadik | G06F 16/9566 |
| 2022/0067030 A1* | 3/2022 | Jiao | G06N 3/084 |
| 2022/0076323 A1* | 3/2022 | Angeli | G06Q 30/0205 |
| 2022/0198779 A1 | 6/2022 | Saraee et al. | |
| 2022/0215065 A1* | 7/2022 | Shetty | G06N 5/022 |
| 2022/0319219 A1* | 10/2022 | Tsibulevskiy | G06T 3/60 |
| 2023/0050054 A1* | 2/2023 | Bakir | G06F 16/90332 |
| 2023/0205981 A1* | 6/2023 | Soyarslan | G06F 16/906 715/234 |

FOREIGN PATENT DOCUMENTS

| | | | | |
|---|---|---|---|---|
| WO | WO-2019025386 A1 * | 2/2019 | | G06F 16/958 |
| WO | WO-2020033117 A9 * | 4/2020 | | G06F 16/958 |

OTHER PUBLICATIONS

"Images in HTML—Overview: Multimedia and embedding," MDN Web Docs Website, Available Online at https://developer.mozilla.org/en-US/docs/Learn/HTML/Multimedia_and_embedding/Images_in_HTML, Available as Early as Apr. 22, 2016, 15 pages.

Nanwani, R., "How to handle loading of images that may not exist?," Imagekit Blog Website, Available Online at https://blog.imagekit.io/how-to-handle-loading-images-that-may-not-exist-on-your-website-92e6c3c6ea63, Mar. 26, 2017, 5 pages.

Singh, Y., "How to check Broken Image with jQuery and AJAX," Makitweb Website, Available Online at https://makitweb.com/check-broken-image-jquery-ajax/, Jun. 4, 2020, 10 pages.

"How to Fix Broken Images and Links on Your Website," Hosting Manual Website, Available Online at https://www.hostingmanual.net/fix-broken-images-links-website/, Available as Early as Jan. 27, 2021, 5 pages.

"FIX 404 Errors Caused by Requests for Missing Files," Journal Xtra Website, Available Online at https://journalxtra.com/web-development/apache/fix-missing-file-404-requests/, Available as Early as Mar. 5, 2021, 6 pages.

* cited by examiner

FIG. 5

| Image ID | Image Path | Alt Text | Image | Exists |
|---|---|---|---|---|
| 001 | /img/whats-new.png | What New Sports are in 2021 Olympics | Broken Image 522 | FALSE |
| 002 | /img/olympic-games.png | Olympic Games | Image 532 | TRUE |
| 003 | /img/basketball.png | Basketball | Image 542 | TRUE |
| 004 | /img/sports.png | Sports | Image 552 | TRUE |

FIG. 6

| Keyword ID | Keyword |
|---|---|
| 001 | Sports |
| 002 | Olympics |
| 003 | Basketball |
| 004 | Baseball |

| Keyword ID | Image ID | | Keyword | Image |
|---|---|---|---|---|
| 001 | 001 | | Sports | Broken Image 522 |
| 002 | 001 | | Olympics | Broken Image 522 |
| 002 | 002 | | Olympics | Image 532 |
| 001 | 004 | | Sports | Image 552 |
| 003 | 003 | | Basketball | Image 542 |

FIG. 7

SYSTEMS AND METHODS FOR AUTOMATIC RESOURCE REPLACEMENT

CROSS-REFERENCE TO RELATED APPLICATIONS

The present application is a continuation of U.S. Non-Provisional application Ser. No. 18/309,447, entitled "SYSTEMS AND METHODS FOR AUTOMATIC RESOURCE REPLACEMENT", filed on Apr. 28, 2023, which is a continuation of U.S. Non-Provisional application Ser. No. 17/656,187, entitled "SYSTEMS AND METHODS FOR AUTOMATIC RESOURCE REPLACEMENT", and filed on Mar. 23, 2022, now U.S. Pat. No. 11,669,582 which claims priority to U.S. Provisional Application No. 63/165,681, entitled "SYSTEMS AND METHODS FOR AUTOMATIC IMAGE REPLACEMENT", and filed on Mar. 24, 2021. The entire contents of the above-listed applications are hereby incorporated by reference for all purposes.

FIELD

The disclosure relates generally to publishing content with web servers, and particularly to automatically replacing missing resources in web pages.

BACKGROUND

When a web server receives a request, the web server responds with a Hypertext Transport Protocol (HTTP) status code. One common status code is a Not Found error message (404) that indicates an issue with the request, such as an issue with the server, the publishing path, or back-end programming. While such error messages are useful for server administrators who may mitigate the issues depending on the type of 404 error, such error messages are not helpful for end users who are accessing a web page. As an example, when loading a web page containing a broken resource, such as a broken image (i.e., an image that is not found during loading of the web page), the web page typically displays a 404 image error to the user. The 404 image error may be depicted with an error image or image placeholder, which may display a small icon or another error image in place of the original image. Further, alternate text for the original image may be displayed in addition to the error image placeholder. Display of such information to the end user may compel the end user to navigate away from the web page and a likelihood of the end user returning to the web page is reduced.

One approach to resolving display of such 404 errors includes a website administrator manually removing the broken resource from the web page, replacing the resource, or otherwise manually mitigating the resource error. Another approach to resolving such 404 errors includes manually specifying an alternate resource to be displayed upon such errors occurring.

SUMMARY

Prior approaches to mitigating 404 errors, such as the approaches discussed hereinabove, are time consuming and still prone to errors. For example, a website administrator may manually specify alternate images for display upon 404 image errors. However, in the event that the alternate image is also missing, the end user may still encounter a 404 image error on a web page. As discussed further herein below, systems and methods are provided that automatically provide a replacement image for broken images in real-time.

In one embodiment, a method comprises determining a link to a first resource in a web page is broken, automatically selecting a second resource from a resource database to replace the first resource in the web page, the second resource of a same type as the first resource, updating the web page with a link to the second resource in place of the link to the first resource, and displaying the updated web page to a user. In this way, resource errors may be mitigated in real-time and user experience of accessing web pages is improved.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below:

FIG. 5 is a block diagram illustrating an example database table for resources on a website and corresponding resource metadata, according to an embodiment;

FIG. 6 is a block diagram illustrating an example database table for resource keywords, according to an embodiment;

FIG. 7 is a block diagram illustrating an example keyword-resource pivot table, according to an embodiment;

DETAILED DESCRIPTION

Figure 1:
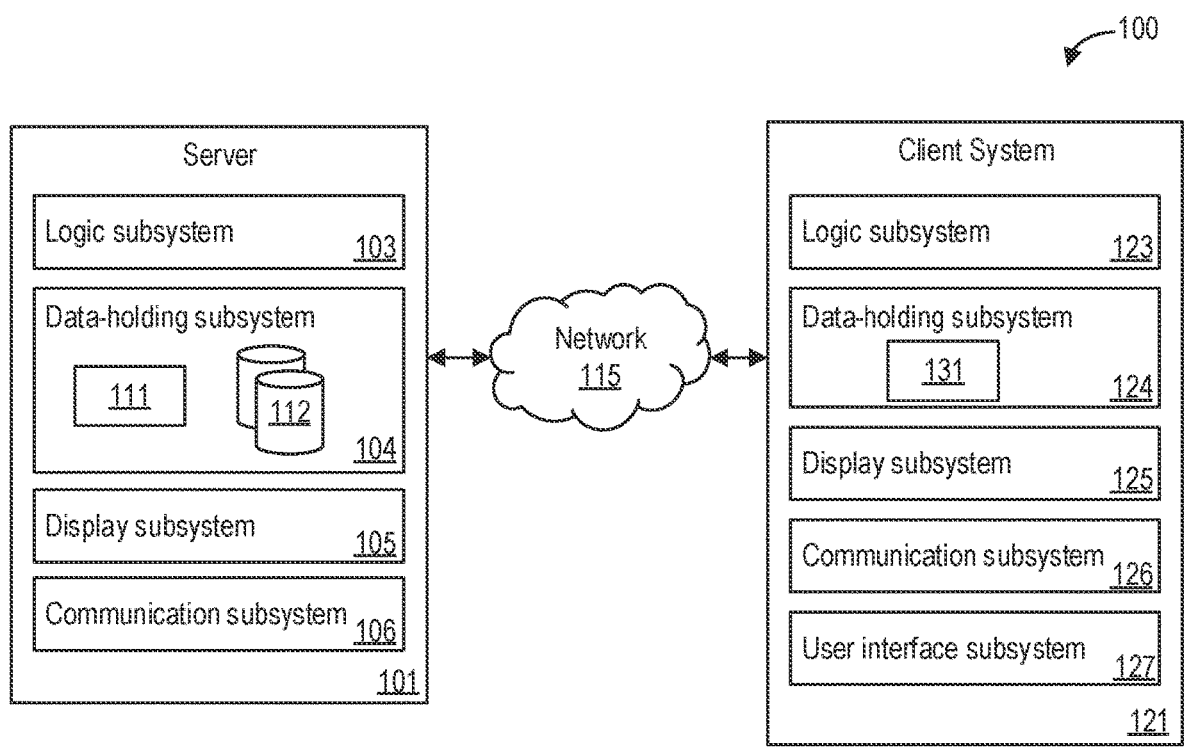
FIG. 1 is block diagram illustrating an example networked computing system for dynamic resource replacement in web pages, according to an embodiment.
Figure 2:
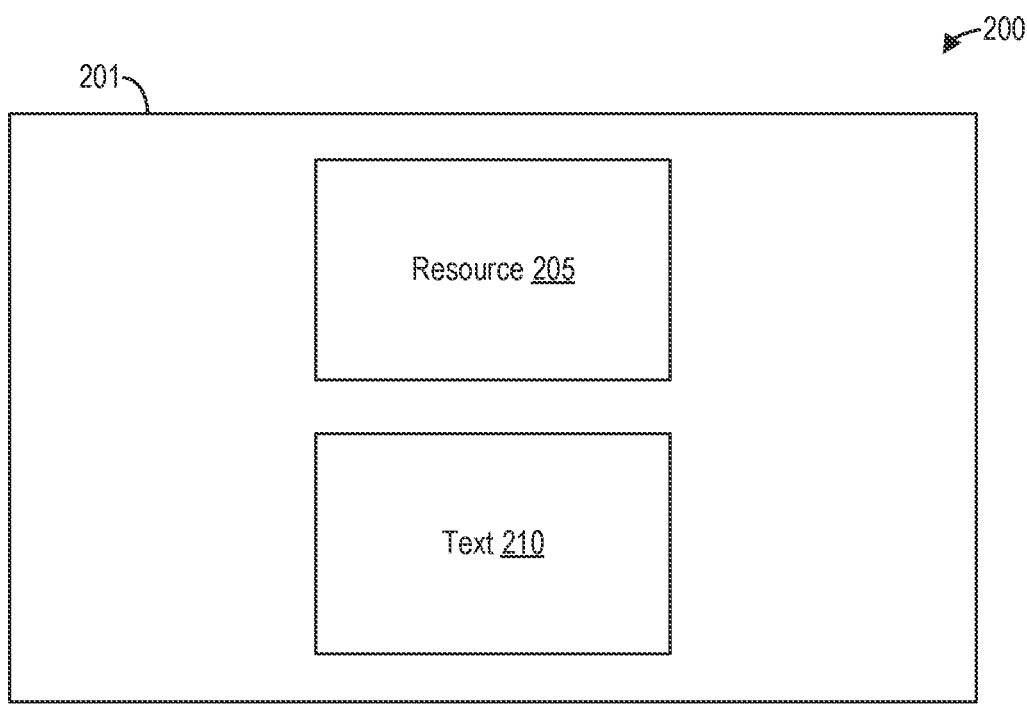
FIG. 2 is a block diagram illustrating an example web page display, according to an embodiment.
Figure 3:
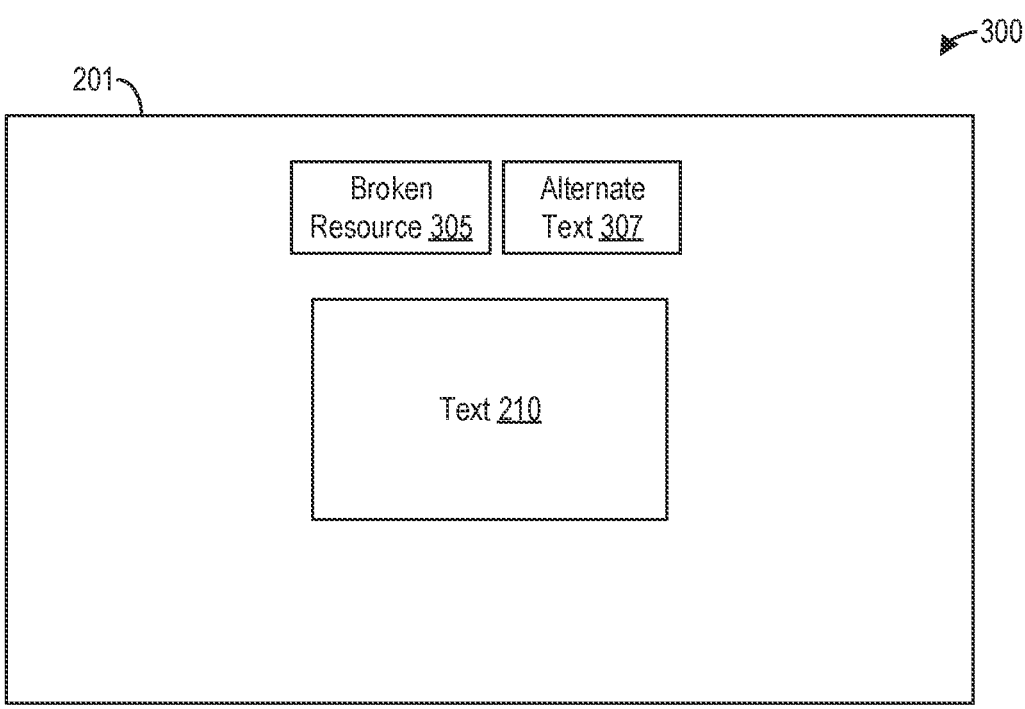
FIG. 3 is a block diagram illustrating an example web page display with a broken resource link, according to an embodiment.
Figure 4:
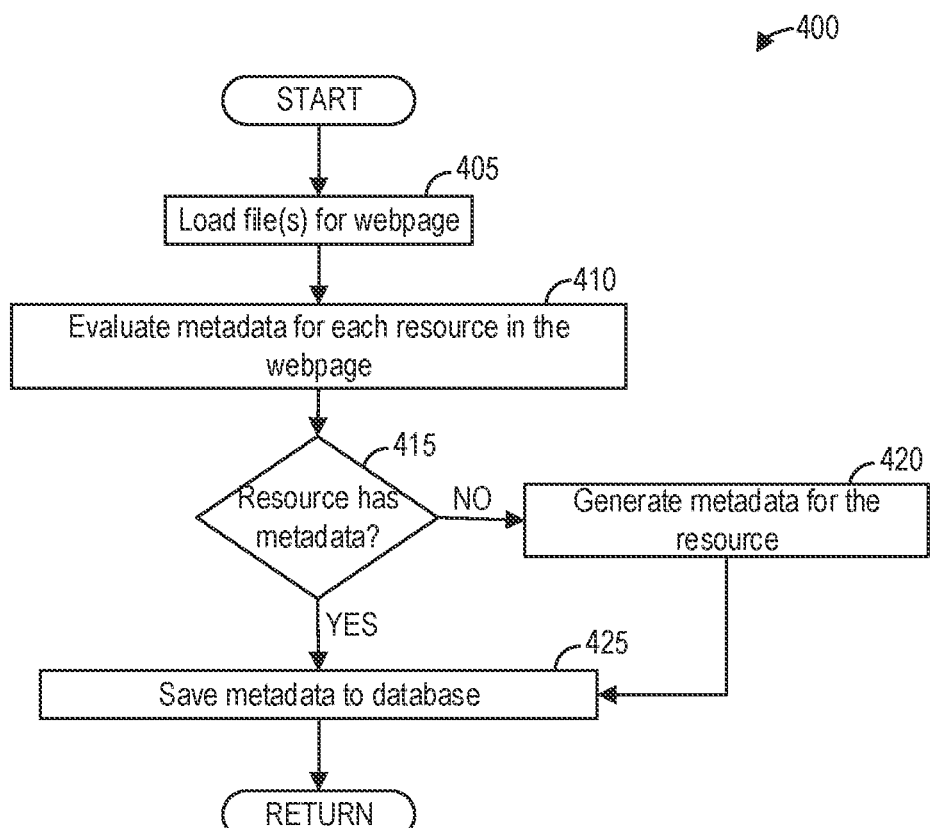
FIG. 4 is a high-level flow chart illustrating an example method for processing resources and resource metadata on a website for populating a resource database, according to an embodiment.
Figure 9:
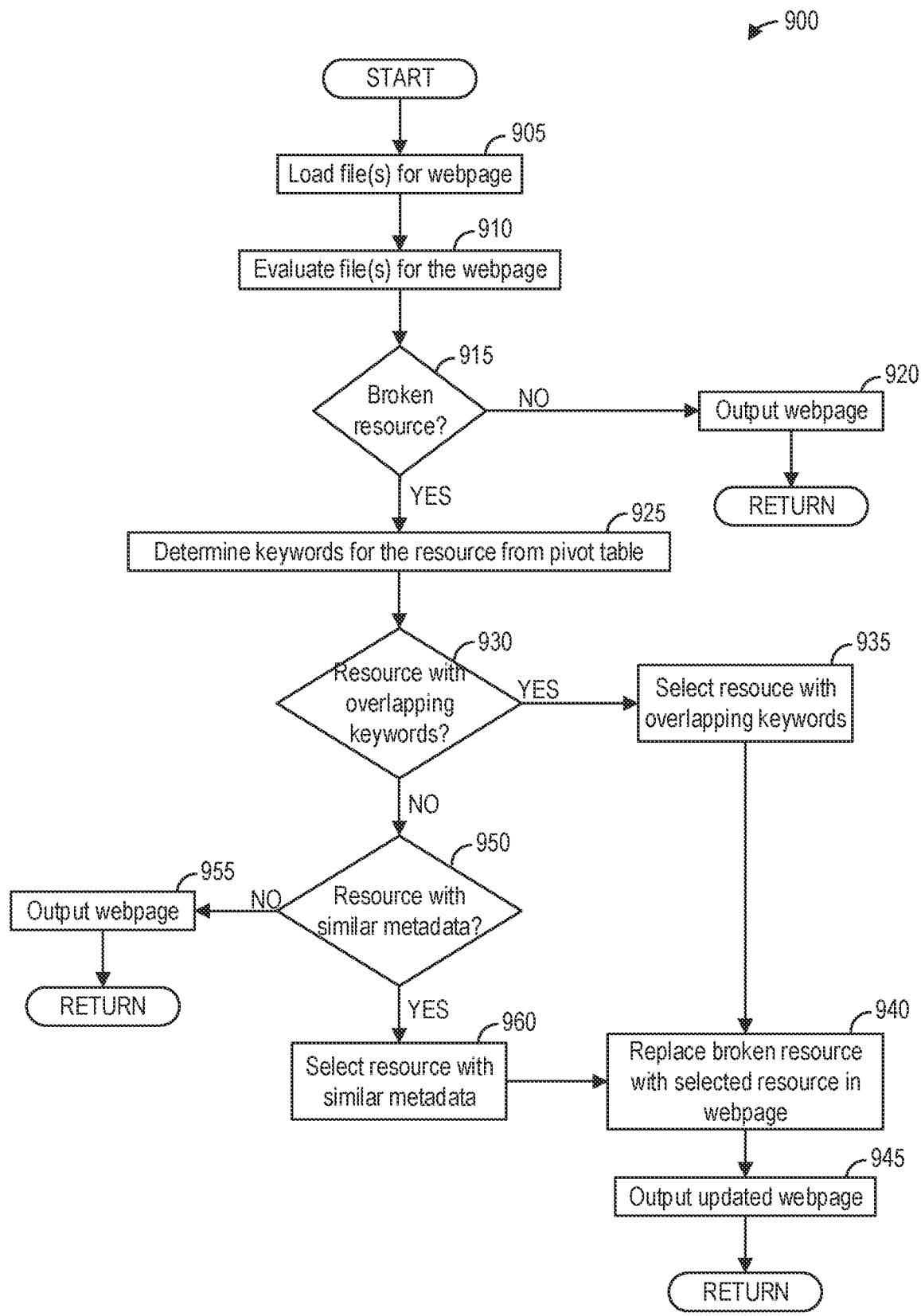
FIG. 9 is a high-level flow chart illustrating an example method for dynamically replacing resources on a website based on resource keywords or other metadata, according to an embodiment.
Figure 10:
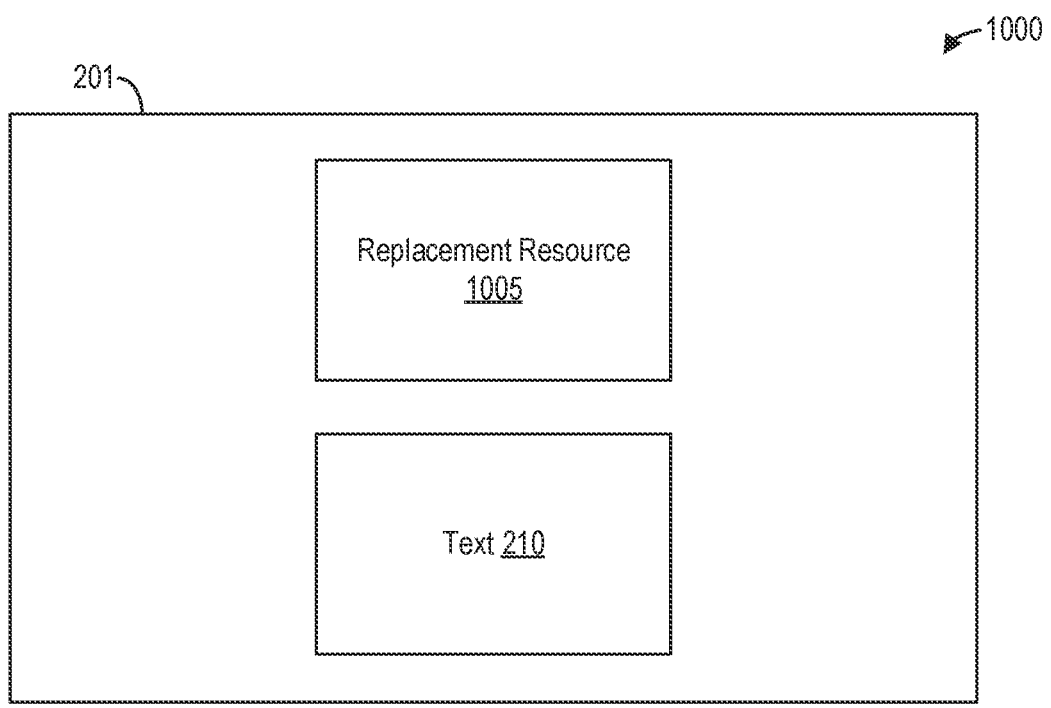
FIG. 10 is a block diagram illustrating an example web page display with a replacement resource, according to an embodiment.

The following description relates to various embodiments of publishing content with web servers, and particularly to automatically replacing missing resources such as images in web pages. The resources may also include text, videos, services, and various other types of resources inserted into the webpages. For example, as depicted in FIG. 1, a system may include a web server that provides web pages to client systems via a network. Users of the client systems may view web pages displayed in a browser of the client system, for example. The web page may include an embedded resource or asset such as an image, as depicted in FIG. 2. However, if the image fails to load for any reason such that the image is broken, thereby resulting in a Not Found (404) error message, a broken image placeholder may be displayed in place of the original image, as depicted in FIG. 3. Such 404 error images are disruptive to the user experience. Instead of displaying an error placeholder image, an alternative image that is similar to the original image may be displayed. To that end, the alternate text of all images on a website may be pre-processed, as shown in FIG. 4, to create an image database containing image metadata as shown in FIG. 5. Keywords may be extracted from the alternate text of the images to create a keyword database, as shown in FIG. 6. A pivot table, as shown in FIG. 7, generated from the image database and the keyword database provides a fast lookup of keywords associated with images in the website. A method for automatically replacing broken images in a web page, such as the method shown in FIG. 8, may use the pivot table to automatically select an image with keywords that overlap keywords of a broken image. Another method for automatically replacing broken images in a web page, such as the method shown in FIG. 9, may further use additional image metadata such as image dimensions and creation date to select replacement images when there are no images with overlapping keywords. As a result, a replacement image may be displayed in place of the original image, as shown in FIG. 10, with similar formatting to the original image. In this way, the user views a suitable replacement image for the original image, with formatting consistent with the original formatting of the web page, rather than an error image. As a result, user experience is improved.

It should be appreciated that although images are described herein, the systems and methods may be implemented for dynamic replacement of any embedded assets or resources in web pages, such as video files, audio files, files, fonts, web pages, iframes, and other multimedia files or linked files.

Resources embedded in a web page are retrieved for populating a web page via a path or uniform resource locator (URL) which indicates the relative or absolute location of the resource for retrieval. If a server determines that a linked resource in a web page does not exist, a 404 error is returned as discussed hereinabove. As discussed further herein, methods and systems are provided for automatically returning a similar resource in the absence of an original linked resource. A replacement resource can be determined contextually on the fly or stored behind the scenes in a database. The replacement resource may be cached for users so that it may be rapidly returned. For images in particular, a dedicated image server can handle all of the processing for determining replacement images. The image server determines what to return when a request is made for a particular image. The image server decides what to send back if an image does not exist. If a website does not have a dedicated server or is a static website, a method for image replacement may include finding a replacement image, and updating a URL of the resource.

For other types of resources, such as text files, audio files, document files, web pages, multimedia files, etc., the resources may similarly be retrieved via a URL, and broken links to the resources may be determined by the server. Various databases may be available for each resource type, which may provide replacements for broken or missing resources. Further, each resource type may have a corresponding server, similar to the image server described above. However, in instances where the resource does not have a server or database, a suitable replacement may be found and used to update the URL of the resource.

Additionally or alternatively, other metadata such as alternate text, path, description, and so on may be updated. In other examples, a microservice implemented as an application programming interface (API) may use Javascript to update such resource attributes in real-time as web pages are loaded at a client system. For example, a client system A may request an image resource with a file name "baseball.png" from a Server B. Server B holds the code that returns related resources. Server B determines that the resource does not exist, and may either find a replacement resource or return a 404 error to the client system A. Server B uses a unique ranking algorithm as described further herein to send back a replacement resource for "baseball.png" to the client system A. The replacement resource may comprise an image of similar size, context, and other metadata. If server B does not have a suitable replacement resource stored locally, server B may request a replacement resource from one or more other servers. Ultimately, client system A still receives a resource named "baseball.png" that is loaded in the web page, though the resource itself may change for different users or stay the same for all users. In some examples, client system A may update the code (e.g., HTML or CSS) for a web page, such as the resource attributes including but not limited to height, width, alternate text, and so on, for the replacement image that is returned unless the replacement image has the same attributes.

Turning now to the figures, FIG. 1 is block diagram illustrating an example networked computing system 100, according to an embodiment. The networked computing system 100 includes a server 101 and a plurality of client systems including at least one client system 121 communicatively coupled to the server 101 via a network 115. It should be appreciated that variations in the arrangement and type of components of the networked computing system 100 may be made without departing from the scope of the present disclosure. For example, the networked computing system 100 may include more than one client system 121 communicatively coupled to the server 101 via the network 115.

Server 101 comprises a computing system configured to serve web pages upon request to one or more client systems such as the client system 121. Although the server 101 is depicted in FIG. 1 as a single device, in some embodiments the system 100 may include a plurality of servers 101 configured for distributed computing. In different embodiments, the server 101 may take the form of a mainframe computer, a server computer, a desktop computer, a laptop computer, a tablet computer, a network computing device, a mobile computing device, a microprocessor, and so on.

Server 101 includes a logic subsystem 103 and a data-holding subsystem 104. Server 101 may optionally include a display subsystem 105, communication subsystem 106, and/or other components not shown in FIG. 1. For example, server 101 may also optionally include user input devices such as keyboards, mice, game controllers, cameras, microphones, and/or touch screen devices.

Logic subsystem 103 may include one or more physical devices configured to execute one or more instructions. For example, logic subsystem 103 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 103 may include one or more processors that are configured to execute software instructions. Additionally or alternatively, the logic subsystem 103 may include one or more hardware or firmware logic machines configured to execute hardware or firmware instructions. Processors of the logic subsystem 103 may be single core or multi-core, and the programs executed thereon may be configured for parallel or distributed processing. The logic subsystem 103 may optionally include individual components that are distributed throughout two or more devices, which may be remotely located and/or configured for coordinated processing. One or more aspects of the logic subsystem 103 may be virtualized and executed by remotely accessible networked computing devices configured in a cloud computing configuration.

Data-holding subsystem 104 may include one or more physical, non-transitory devices configured to hold data and/or instructions executable by the logic subsystem 103 to implement the herein described methods and processes. When such methods and processes are implemented, the state of data-holding subsystem 104 may be transformed (for example, to hold different data).

In one example, the server 101 comprises a web server for providing web pages of a website to the client system 121. In another example, the server 101 comprises a resource server or a content server for providing resources or assets such as images, videos, audio, and other types of files for embedding within web pages of a website rendered at a client system 121. Resources may be defined as any entity that can be identified, named, addressed, or handled on the website or any networked information system. Identification of the resources may be provided using URLs and a resource may be a conceptual mapping to an entity or set of entities, which may be static or dynamic. Types of the resources may encompass a wide range of entities, including relatively static objects, such as files and documents, to more abstract items, such as mathematical operators and operands. Regardless of the type, the resources may be described via metadata in a standardized manner and, when missing from a web page, may be displayed as a 404 error message.

In order to reduce 404 error messages relating to broken resource links on a web page, the server 101 may include a dynamic resource replacement system 111 configured as executable instructions in the data-holding subsystem 104. The dynamic resource replacement system 111 may process code of a website to generate one or more databases 112. In particular, as described further herein, the dynamic resource replacement system 111 may evaluate code relating to resources and resource metadata in a website, generate one or more databases 112 based on the evaluated code, and dynamically replace missing resources in a web page with suitable replacement resources based on the one or more databases 112. Although the one or more databases 112 are depicted as stored in the data-holding subsystem 104 of the server 101, it should be appreciated that in some examples, the one or more databases 112 may be stored in a separate computing system communicatively coupled to the server 101 and accessible via the network 115. As an illustrative and non-limiting example, the one or more databases 112 may be stored on a separate content server (not shown) that further stores resources and other content for a website.

Data-holding subsystem 104 may include removable media and/or built-in devices. Data-holding subsystem 104 may include optical memory (for example, CD, DVD, HD-DVD, Blu-Ray Disc, etc.), and/or magnetic memory devices (for example, hard drive disk, floppy disk drive, tape drive, MRAM, etc.), and the like. Data-holding subsystem 104 may include devices with one or more of the following characteristics: volatile, nonvolatile, dynamic, static, read/write, read-only, random access, sequential access, location addressable, file addressable, and content addressable. In some embodiments, logic subsystem 103 and data-holding subsystem 104 may be integrated into one or more common devices, such as an application-specific integrated circuit or a system on a chip. One or more aspects of the data-holding subsystem 104 may be devices configured in a cloud computing configuration, in some examples.

It is to be appreciated that data-holding subsystem 104 includes one or more physical, non-transitory devices. In contrast, in some embodiments aspects of the instructions described herein may be propagated in a transitory fashion by a pure signal (for example, an electromagnetic signal) that is not held by a physical device for at least a finite duration. Furthermore, data and/or other forms of information pertaining to the present disclosure may be propagated by a pure signal.

When included, display subsystem 105 may be used to present a visual representation of data held by data-holding subsystem 104. As the herein described methods and processes change the data held by the data-holding subsystem 104, and thus transform the state of the data-holding subsystem 104, the state of display subsystem 105 may likewise be transformed to visually represent changes in the underlying data. Display subsystem 105 may include one or more display devices utilizing virtually any type of technology. Such display devices may be combined with logic subsystem 103 and/or data-holding subsystem 104 in a shared enclosure, or such display devices may be peripheral display devices.

When included, communication subsystem 106 may be configured to communicatively couple server 101 with one or more other computing devices, such as client system 121. Communication subsystem 106 may include wired and/or wireless communication devices compatible with one or more different communication protocols. As non-limiting examples, communication subsystem 106 may be configured for communication via a wireless telephone network, a wireless local area network, a wired local area network, a wireless wide area network, a wired wide area network, etc. In some embodiments, communication subsystem 106 may allow server 101 to send and/or receive messages to and/or from other devices via a network such as the public Internet. For example, communication subsystem 106 may communicatively couple server 101 with client system 121 via the network 115. In some examples, network 115 may be the public Internet. In other examples, network 115 may be regarded as a private network connection and may include, for example, a virtual private network or an encryption or other security mechanism employed over the public Internet.

Further, the server 101 provides a network service that is accessible to a plurality of users through a plurality of client systems such as the client system 121 communicatively coupled to the server 101 via the network 115. As such, the networked computing system 100 may include one or more devices operated by users, such as client system 121. Client system 121 may be any computing device configured to access a network such as network 115, including but not limited to a personal desktop computer, a laptop, a smartphone, a tablet, and the like. While one client system 121 is shown, it should be appreciated that any number of user devices or client systems may be communicatively coupled to the server 101 via the network 115.

Client system 121 includes a logic subsystem 123 and a data-holding subsystem 124. Client system 121 may optionally include a display subsystem 125, communication subsystem 126, a user interface subsystem 127, and/or other components not shown in FIG. 1.

Logic subsystem 123 may include one or more physical devices configured to execute one or more instructions. For example, logic subsystem 123 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 123 may include one or more processors that are configured to execute software instructions. Additionally or alternatively, the logic subsystem 123 may include one or more hardware or firmware logic machines configured to execute hardware or firmware instructions. Processors of the logic subsystem 123 may be single or multi-core, and the programs executed thereon may be configured for parallel or distributed processing. The logic subsystem 123 may optionally include individual components that are distributed throughout two or more devices, which may be remotely located and/or configured for coordinated processing. One or more aspects of the logic subsystem 123 may be virtualized and executed by remotely accessible networking computing devices configured in a cloud computing configuration.

Data-holding subsystem 124 may include one or more physical, non-transitory devices configured to hold data and/or instructions executable by the logic subsystem 123 to implement the herein described methods and processes. When such methods and processes are implemented, the state of data-holding subsystem 124 may be transformed (for example, to hold different data).

Data-holding subsystem 124 may include removable media and/or built-in devices. Data-holding subsystem 124 may include optical memory (for example, CD, DVD, HD-DVD, Blu-Ray Disc, etc.), and/or magnetic memory devices (for example, hard drive disk, floppy disk drive, tape drive, MRAM, etc.), and the like. Data-holding subsystem 124 may include devices with one or more of the following characteristics: volatile, nonvolatile, dynamic, static, read/write, read-only, random access, sequential access, location addressable, file addressable, and content addressable. In some embodiments, logic subsystem 123 and data-holding subsystem 124 may be integrated into one or more common devices, such as an application-specific integrated circuit or a system on a chip.

When included, display subsystem 125 may be used to present a visual representation of data held by data-holding subsystem 124. As the herein described methods and processes change the data held by the data-holding subsystem 124, and thus transform the state of the data-holding subsystem 124, the state of display subsystem 125 may likewise be transformed to visually represent changes in the underlying data. Display subsystem 125 may include one or more display devices utilizing virtually any type of technology. Such display devices may be combined with logic subsystem 123 and/or data-holding subsystem 124 in a shared enclosure, or such display devices may be peripheral display devices.

In one example, the client system 121 may include executable instructions 131 in the data-holding subsystem 124 that when executed by the logic subsystem 123 cause the logic subsystem 123 to perform various actions as described further herein. As one example, the client system 121 may be configured, via the instructions 131, to receive a web page including one or more images transmitted by the server 101, and display the web page including the one or more images via a graphical user interface on the display subsystem 125 to a user.

When included, communication subsystem 126 may be configured to communicatively couple client system 121 with one or more other computing devices, such as server 101. Communication subsystem 126 may include wired and/or wireless communication devices compatible with one or more different communication protocols. As non-limiting examples, communication subsystem 126 may be configured for communication via a wireless telephone network, a wireless local area network, a wired local area network, a wireless wide area network, a wired wide area network, etc. In some embodiments, communication subsystem 126 may allow client system 121 to send and/or receive messages to and/or from other devices, such as server 101, via a network 115 such as the public Internet.

Client system 121 may further include the user interface subsystem 127 which may include user input devices such as keyboards, mice, game controllers, cameras, microphones, and/or touch screens. A user of client system 121 may input a request to load or otherwise interact with a web page stored by the server 101, for example, via user interface subsystem 127.

Thus server 101 and client system 121 may each represent computing devices which may generally include any device that is configured to perform computation and that is capable of sending and receiving data communications by way of one or more wired and/or wireless communication interfaces. Such devices may be configured to communicate using any of a variety of network protocols. For example, client system 121 may be configured to execute a browser application stored as the instructions 131 that employs HTTP to request information from server 101 and then displays the retrieved information to a user on a display such as the display subsystem 125.

FIG. 2 is a block diagram illustrating an example web page display 200 of a web page 201. The web page 201 includes a resource 205, which, in one example, may be an image 205. In other examples, however, the resource 205 may be a video, an audio file, a service, or some other type of resource, as described above. The web page 201 also includes text 210. The image 205 and the text 210 are relatively positioned in the web page 201 as depicted. The web page display 200 thus represents how the web page 201 is intended to be displayed to a user within a browser.

However, if the file for the image 205 is not found upon the browser loading the web page 201, the image 205 cannot be displayed within the web page 201. Instead, as illustrated by the example web page display 300 of the web page 201 in FIG. 3, when a link to the image 205 is broken, thereby resulting in a not found (404) error response, a broken image placeholder 305 is displayed in place of the image 205. In addition, alternate text 307 may be displayed adjacent to the broken image placeholder 305. The broken image placeholder 305 may be displayed as an image or icon indicating a broken image. Given the absence of the original image 205 in the web page display 300, the alternate text 307 is displayed to provide a textual description of the original image 205. Often when a not found (404) error occurs for an image, the use of the broken image placeholder 305 and alternate text 307 in place of the original image 205 disrupts the formatting of the web page 201, as depicted in FIG. 3. Sometimes, the dimensions of the broken image placeholder 305 may be scaled to match the dimensions of the original image 205 in order to preserve the formatting of the web page 201. However, in such instances, the user may thus be presented with a relatively large error image or broken image placeholder 305 in the web page 201. As discussed further herein, methods and systems are provided for automatically and dynamically replacing broken images with replacement images that are not placeholder error images, but instead comprise images that are similar to the original image.

It should be appreciated that some resources may not include metadata such as alternate text. For example, a 404 error may be returned for a broken hyperlink resource that is not configured with alternate text. In such examples, other metadata associated with the broken hyperlink resource may be used to select a replacement resource as described herein.

FIG. 4 is a high-level flow chart illustrating an example method 400 for evaluating resources on a website, according to an embodiment. In particular, method 400 relates to pre-processing resource links in web code to generate a database storing alternate text for the resources of a website. Method 400 is described with regard to the systems and components of FIG. 1, though it should be appreciated that method 400 may be implemented with other systems and components without departing from the scope of the present disclosure. Method 400 may be implemented as executable instructions stored in non-transitory memory of the server 101, such as in the dynamic resource replacement system 111 of FIG. 1, and may be executed by a processor of the logic subsystem 103 of the server 101 to perform the actions described herein.

Method 400 begins at 405. At 405, method 400 loads file(s) for a web page. The file(s) may include information formatted in a known manner, such as via Hyper Text Mark-up Language (HTML) and/or cascading style sheets (CSS) as illustrative and non-limiting examples. The file(s) may include at least one link to a resource, such as an image, to be displayed in the web page when the file(s) are executed by a browser.

At 410, method 400 evaluates metadata and attributes for each resource, including alternate text ("Alt Text") for each resource linked in the file(s). For example, when the resource is an image, the image to be displayed in the web page is indicated in the file(s) via an image tag (e.g., "img" or "picture") that includes one or more attributes for loading and formatting the image in the web page. The attributes include one or more of an image path indicating a location of the image file, an alternate text comprising a textual description of the image, a height for display of the image, a width for display of the image, and so on. Websites built properly for accessibility typically include alternate text for each image such that the alternate text may be displayed when the image cannot be seen or displayed, for example, because the image file is not located at the image path, the computing system storing the file is at least temporarily not operable or reachable, the user is using screen reading technology or other accessibility technology for conveying the content of the web page to the user, the browser does not support the image type, and so on. When the image is not displayed for any reason, the browser is configured to display or otherwise output the corresponding alternate text in place of the image. Another image attribute comprises a "title" which may comprise additional textual information relating to the image.

At 415, method 400 determines whether each resource, e.g., image, linked in the web page has metadata such as an alternate text or a title provided. If an image does not have metadata such as alternate text ("NO"), method 400 proceeds to 420. At 420, method 400 generates metadata, such as alternate text, for the image. Method 400 may automatically generate metadata such as alternate text for the image, for example by processing the image with one or more deep learning models trained to classify images. For example, trained image classifiers such as convolutional neural networks may process the image to identify one or more keywords associated with the image. Such automatically-generated alternate text may comprise keyword classifications, or in some examples a natural language model may construct a natural language description of the image based on the one or more keyword classifications. As another example, method 400 may prompt a user to manually provide metadata such as alternate text for the image. As yet another example, method 400 may automatically generate alternate text based on a file name of the image. As another example, method 400 may automatically generate alternate text based on one or more computer vision techniques, for example by processing the image with the one or more computer vision techniques to identify content of the image.

After generating the metadata, such as alternate text, at 420, method 400 then proceeds to 425, and saves the metadata generated at 420 to a database, such as the database 112. Method 400 further saves other attributes associated with the image to the database. Method 400 then returns.

Referring again to 415, if the resource, such as the image, has metadata such as alternate text ("YES"), method 400 proceeds from 415 to 425. At 425, method 400 saves the metadata such as alternate text for the image to the database, such as the database 112, along with other image attributes as discussed herein. Method 400 then returns.

Thus, method 400 may evaluate one or more web pages of a website, wherein at least one web page of the one or more web pages includes at least one image. For each image linked in the website, method 400 generates an entry in a database for the image including one or more attributes associated with the image, including alternate text. If the website does not include alternate text for an image, method 400 generates alternate text for the image for storage in the database.

As an illustrative and non-limiting example, FIG. 5 is a block diagram illustrating an example database table 500 for resources, such as images, on a website and corresponding image metadata, according to an embodiment. The database table 500 as depicted comprises a relational database, though it should be appreciated that other database constructs may be used, such as a graph database, without departing from the scope of the present disclosure.

The database table 500 includes a plurality of table headers 510, corresponding to an image ID 511, an image path 512, alternate text 513, an image 514, and an existence determination 515. It should be appreciated that the database table 500 may include other attributes or metadata, in some examples, such as image dimensions, color space, color profile, a title, a creation timestamp indicating a time the image was created, a modification timestamp indicating a time the image was last modified, a file type of the image, a file size of the image, an author of the image, a file name of the image, and so on.

The database table 500 further includes a plurality of database entries, including a first database entry 520, a second database entry 530, a third database entry 540, and a fourth database entry 550. Each database entry of the database table 500 corresponds to an image linked in a website. Each database entry thus includes an image ID 511 including a unique identifier generated for and assigned to an image, an image path indicating a location of the image file, alternate text for the image, the image as retrieved from the image path location, and an existence determination providing an indication of whether the image is located at the image path location. As depicted, the image path for the first database entry 520 does not return an image, and so the first database entry 520 includes a broken image placeholder 522 and an existence determination of FALSE for the image. In contrast, the linked images for the database entries 530, 540, and 550 exist ("TRUE") and so corresponding images 532, 542, and 552 are displayed in the corresponding database entries. An image server such as server 101 may determine a replacement image as described herein for an image with an existence determination of "FALSE" and cache the determined replacement image, so that the image server may return the replacement image when the missing image is requested.

FIG. 6 is a block diagram illustrating an example database table 600 for image keywords, according to an embodiment. The database table 600 may include each keyword found in the alternate text of the images in a website. The database table 600 includes table headers 610 such as a keyword ID 611 and a keyword 612. The database table 600 further includes a plurality of database entries including a first database entry 620, a second database entry 630, a third database entry 640, and a fourth database entry 650. The example database entries are generated from the alternate text of the images stored in the database table 500, for example. Each keyword extracted from the alternate text is assigned a unique keyword identifier ("ID"). Thus, the first database entry 620 includes a keyword ID "001" for the keyword "Sports," the second database entry 630 includes a keyword ID "002" for the keyword "Olympics," the third database entry 640 includes a keyword ID "003" for the keyword "Basketball," and the fourth database entry 650 includes a keyword ID "004" for the keyword "Baseball."

To construct the keyword database table 600, natural language processing may be applied to all alternate text of the database table 500 to extract keywords while excluding common terms such as "the" or "a" from the keyword database 600. Entity recognition may be used to find keywords, for example based on nouns in the alternate text, and descriptive adjectives (e.g., colors, verbs) may additionally or alternatively be identified for use as keywords. Further, keywords for an image may be determined based on context of the image, for example based on keywords of other images linked on a same web page as the image and positioned adjacent to or otherwise within proximity to the image, and additionally or alternatively keywords for the image may be determined based on text in a web page positioned adjacent to the image in the web page.

FIG. 7 is a block diagram illustrating an example keyword-image pivot table 700, according to an embodiment. The keyword-image pivot table 700 associates unique keyword identifiers for keywords with matching unique identifiers of an image associated with the keyword. The keyword-image pivot table 700 thus includes table headers 710 such as keyword ID 711, image ID 712, keyword 713, and the image 714. The keyword-image pivot table 700 includes a plurality of database entries, including a first database entry 720, a second database entry 730, a third database entry 740, a fourth database entry 750, and a fifth database entry 760.

The first database entry 720 associates the keyword ID "001" with the image ID "001" and thus associates the first database entry 620 of the keyword database table 600 with the first database entry 520 of the image database table 500 because the keyword "Sports" is associated with alternate text of the broken image 522. The second database entry 730 associates the keyword ID "002" with the image ID "001" because the keyword "Olympics" is associated with the alternate text of the broken image 522. The third database entry 740 associates the keyword ID "002" with the image ID "002" because the keyword "Olympics" is associated with the alternate text of the image 532. The fourth database entry 750 associates the keyword ID "001" with the image ID "004" because the keyword "Sports" is associated with the alternate text of the image 552. The fifth database entry 760 associates the keyword ID "003" with the image ID "003" because the keyword "Basketball" is associated with the alternate text of the image 542.

The keyword-image pivot table 700 thus provides a technique for fast lookup of keywords and images. Such a pivot table 700 enables a rapid replacement of broken images in a web page, for example as described further herein with regard to FIG. 8. Furthermore, although the pivot table 700 is directed to associating keywords and images, it should be appreciated that one or more pivot tables may be generated to associate images with other attributes such as color space, size, creation timestamps, and so on. In this way, replacement images may be selected based on common attributes other than keywords, as discussed further herein with regard to FIG. 9.

Figure 8:
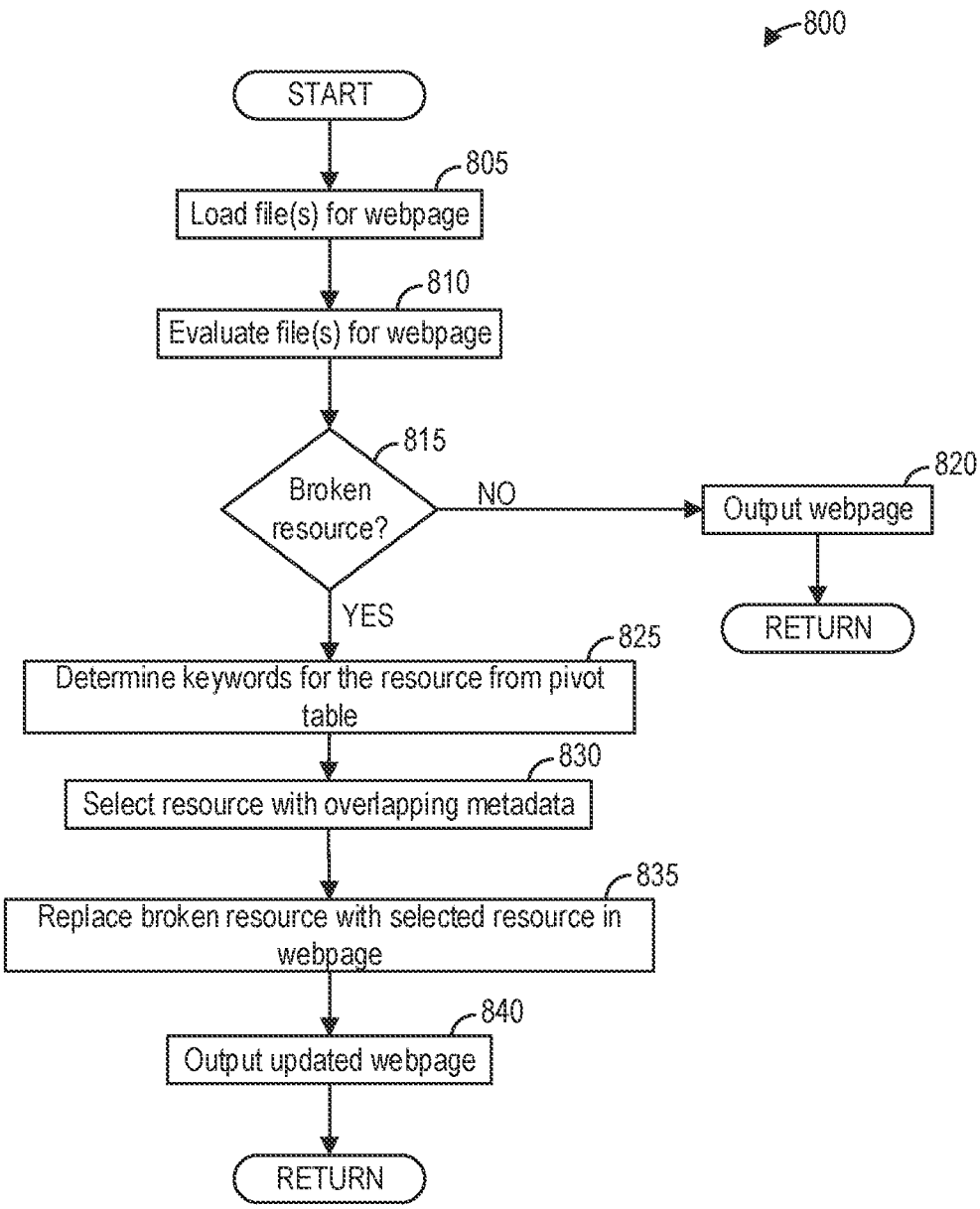
FIG. 8 is a high-level flow chart illustrating an example method for dynamically replacing resources on a website based on resource keywords, according to an embodiment.

FIG. 8 is a high-level flow chart illustrating an example method 800 for dynamically replacing resources on a website based on resource keywords, according to an embodiment. In particular, method 800 addresses identification of a broken image (e.g., an image whose image path results in a not found error), and replacing the broken image with a suitable replacement image based on overlapping keywords. However, as described, the resources may be any other type of resource and may be similarly replaced via method 800 by a resource of the same type. For example, broken links to audio files, video files, documents, web pages, mathematical equations, services, etc., may also be identified and rectified by utilizing overlapping keywords specific to the resource and based on metadata of the resource.

Method 800 is described with regard to the systems and components of FIG. 1, though it should be appreciated that the method 800 may be implemented with other systems and components without departing from the scope of the present disclosure. Method 800 may be implemented as executable instructions in non-transitory memory of a computing system, and may be executed by a processor of said computing system. In some examples, method 800 may be executed by a client system, such as the client system 121, when the client system 121 loads a web page retrieved from a server 101. In other examples, method 800 may be executed by the server 101 prior to transmitting file(s) for a web page to a client system 121 for display in a browser of the client system 121.

Method 800 begins at 805. At 805, method 800 loads file(s) for a web page. At 810, method 800 evaluates the file(s) for the web page. For example, method 800 may evaluate the linked resources, such as images, in the file(s) for the web page to determine whether there are any broken images (i.e., whether any image link returns a not found (404) error). In some examples, to avoid showing a 404 error to a user altogether, all file paths or uniform resource locators (URLs) may be passed through a dedicated server configured to determine what resource to return. The dedicated server, which may comprise an image server or another type of content server, may select replacement images as described herein and return such replacement images when a broken image is requested, thereby preventing 404 errors at the client system.

At 815, method 800 determines whether there is a broken resource, e.g., broken image, in the web page. If there are no broken images ("NO"), method 800 continues to 820. At 820, method 800 outputs the web page for display to the user via a browser. Method 800 then returns.

However, if there is a broken image ("YES") at 815, method 800 continues to 825. At 825, method 800 determines keywords for the image from a pivot table, such as a keyword-image pivot table. For example, with regard to the example keyword-image pivot table 700 and the broken image 522, method 800 determines that the keyword IDs associated with the image ID "001" for the broken image 522 are "001" and "002," such that the keywords associated with the broken image 522 are "Sports" and "Olympics."

At 830, method 800 selects an image with overlapping metadata such as keywords. For example, method 800 selects an image from the pivot table with at least one matching keyword. If there are a plurality of images with overlapping keywords, method 800 may select an image with the largest number of matching keywords (e.g., an image with two matching keywords may be selected rather than an image with one matching keyword). As an illustrative example, with regard to the example keyword-image pivot table 700 and the broken image 522, method 800 may identify the image 532 and the image 552 as potential replacement images because each image 532 and 552 has one matching keyword with the broken image 522. In such examples wherein more than one potential replacement image are associated with a same number of matching keywords, method 800 may select one replacement image from the plurality of potential replacement images based on other attributes or metadata associated with each potential replacement image relative to the image. For example, method 800 may select an image with one or more of a same author as the broken image, same dimensions as the broken image, same image resolution, same creation date as the broken image, and so on. Such attributes may be weighted according to user definitions, in some examples. Further, method 800 may determine whether any of the potential replacement images are already used in the web page linking the broken image and remove such potential replacement images from selection in order to avoid duplicate images being displayed on a web page. For example, if the replacement resource is cached, then method 800 may simply retrieve the replacement resource rather than determine a new replacement image. Method 800 may thus select a replacement image based on overlapping metadata according to a ranking algorithm, where images with the most similarity (e.g., overlapping metadata) determined according to weights assigned for each type of metadata are selected as a replacement image. In some examples, if method 800 determines that a replacement resource does not exist, method 800 may identify a same resource from another server or for another website, and method 800 may select the same resource as a replacement. For example, if the linked resource or asset comprises a font file, method 800 may locate the font file for another website and use a link to the font file for the other website as a replacement link.

At 835, method 800 replaces the broken image with the selected image in the web page. For example, method 800 may replace the image path for the broken image with the image path to the selected image in the file(s) for the web page. Alternatively, method 800 may insert an attribute tag that designates the selected image to be displayed responsive to an error loading the broken image. For example, method 800 may automatically insert an "onerror" attribute within the "img" tag in the HTML of the web page with the image path to the selected image. In this way, if the original image fails to load, then the selected image or replacement image linked in the "onerror" attribute is loaded. Further, in some examples, the "onerror" update may be maintained in the web page stored on the server for future replacement of the original image, to reduce method 800 replicating the steps to identify the replacement image upon subsequent requests for the web page. Method 800 may further check for cascading style sheets (CSS) styles, media queries, and container dimensions to ensure that a properly-sized resource is used for the replacement image. Alternatively, method 800 may return a different image from a dedicated image server 101.

At 840, method 800 outputs the updated web page with the replacement image for the display to the user via the browser. Method 800 then returns.

Thus, method 800 enables the rapid and automatic replacement of a broken image with a suitable replacement image. In this way, the formatted display of a web page to a user may be consistent with the original design of the web page, without the use of broken image placeholders and alternate text that may negatively impact the user experience and disrupt the remaining formatting of the web page.

In some examples, replacement images may be identified and selected even in the absence of overlapping keywords. FIG. 9 is a high-level flow chart illustrating an example method 900 for dynamically replacing resources, such as images, on a website based on image keywords or other metadata, according to an embodiment. As described above, while method 900 is described with respect to images, method 900 is similarly applicable to replace any type of resource determined to be missing from a website. Method 900 is described with regard to the systems and components of FIG. 1, though it should be appreciated that the method 900 may be implemented with other systems and components without departing from the scope of the present disclosure. Method 900 may be implemented as executable instructions in non-transitory memory of a computing system, and may be executed by a processor of said computing system. In some examples, method 900 may be executed by a client system, such as the client system 121, when the client system 121 loads a web page retrieved from a server 101. In other examples, method 900 may be executed by the server 101 prior to transmitting file(s) for a web page to a client system 121 for display in a browser of the client system 121.

Method 900 begins at 905. At 905, method 900 loads file(s) for a web page. At 910, method 900 evaluates the file(s) for the web page. For example, method 900 may evaluate the linked resources, e.g., linked images, in the file(s) for the web page to determine whether there are any broken images (i.e., whether any image link returns a not found (404) error).

At 915, method 900 determines whether there is a broken image on the web page. If there are no broken images ("NO"), method 900 proceeds to 920, where method 900 outputs the web page for display to a user via a browser. Method 900 then returns.

However, if there is a broken image ("YES"), method 900 proceeds to 925. At 925, method 900 determines keywords for the image from the pivot table, such as a keyword-image pivot table. At 930, method 900 determines whether there is an image with overlapping keywords.

If there is an image with overlapping keywords ("YES"), method 900 continues to 935. At 935, method 900 selects the image with the overlapping keywords. Method 900 then replaces the broken image with the selected image in the web page at 940, and outputs the updated web page including the replacement image for display to the user at 945. Method 900 then returns. Thus, when there are images with overlapping keywords, method 900 is consistent with method 800 as described hereinabove.

However, referring again to 930, if method 900 determines that there is no image with overlapping keywords ("NO"), method 900 continues to 950. At 950, method 900 determines whether there is an image with similar metadata. Method 900 may determine whether there is an image with similar metadata based on another pivot table other than a keyword-image pivot table. The metadata may include attributes such as image dimensions, image type, color space, creation date, and so on. Method 900 may thus identify an image with one or more similar attributes to the broken image, and select an image with the most overlapping attributes.

If there are no images with similar metadata ("NO"), method 900 continues to 955, where method 900 outputs the web page with the broken image. Method 900 then returns.

However, if there is an image with similar metadata ("YES"), method 900 continues from 950 to 960. At 960, selects the image with similar metadata as a replacement image. Method 900 then proceeds to 940, where method 900 replaces the broken image in the web page with the selected image. At 945, method 900 outputs the updated web page with the replacement image. Method 900 then returns.

In some examples, replacement images may be identified and selected in the absence of overlapping keywords and in the absence of image keywords or other metadata. For example, if it is determined that there is a broken image, as described above with reference to FIGS. 8-9, a replacement image may be identified and selected using machine learning and/or other visual identification technology. The broken image may be scanned or otherwise analyzed to identify characteristics of the broken image. The machine learning and/or other visual identification technology may be trained using a training set of images, which may include a plurality of broken images and a plurality of replacement images associated with each of the plurality of broken images. The machine learning and/or other visual identification technology may learn patterns and/or other identifying characteristics of a broken image which are similarly represented in at least one replacement image. This may result in a trained machine learning and/or other visual identification technology which may automatically identify a replacement image for a broken image. For example, the trained technology may scan a database of images, such as open-access images or other images of the website, to identify an image which may have similar characteristics to the broken image and/or be a potential replacement image.

In a second embodiment, a machine learning method for machine learning-based resource replacement may be trained to identify potential replacement images for a broken image using a training set consisting of resources (e.g., images) from web pages which refer to a similar topic as the web page having the broken image. For example, the machine learning method may scan the website for at least one article (e.g., web page) which refers to a similar topic as the web page having the broken image. Articles (e.g., the at least one article and the article having the broken image) may be identified as referring to a similar topic based on text, images, and/or other media displayed in the articles, and/or meta data of the articles. The machine learning model may then be trained using images of the at least one article which refers to the similar topic, and a trained machine learning model may be able to identify potential replacement images from a database of images, as described above with reference to FIGS. 8-9. By training the machine learning model using web pages and/or websites which refer to the same topic or a similar topic to the topic of the article with the broken image, the machine learning model may more accurately predict a replacement image (e.g., resource).

Additionally, or alternatively, the trained machine learning model may be able to identify replacement resources other than images by scanning credible websites and/or web pages other than those on the same website as the web page with the broken image. For example, a website and/or web page may be identified as credible based on a database of resourced curated by a trusted third-party and/or by the website administrator. The database may be consulted to determine if a website identified as referring to the same or a similar topic as the web page with the broken image is credible. Additionally, or alternatively, websites included in the database may be scanned for web pages which refer to the same or a similar topic as the web page with the broken image. A candidate websites and/or web pages may also be identified as credible based on an author or publisher of a website. For example, if the author and/or publisher of the candidate website is a contributor to the website of the web page having the broken image, the candidate website may be determined to be credible, and may be used to identify replacement resources.

In a third embodiment, a trained machine learning model may read content surrounding the broken image, such as text, other images, and/or links, to identify web page characteristics, such as objects (e.g., dog, cat, etc.) and/or semantics (e.g., happy, sad, light, upbeat, and so on). The trained machine learning model may search for at least one replacement image for the broken image based on the identified objects and/or semantics. In this way, the trained machined learning model may act as a context-aware resource replacement model based on content of the web page having the broken image.

In a fourth embodiment, a machine learning model may be trained using meta tags of images (e.g., broken images and non-broken images on the same web page as the broken image) and other context of the web page. The trained machine learning model may then identify replacement images which have similar meta tags, such as width, height, alt text, description, and so on. For example, a replacement image may be an image having a width which is within a non-zero threshold of a width of the broken image. The non-zero threshold may be 5 pixels, for example. When alt text and/or description are used to identify a replacement image, the alt text and/or description of the replacement image may have a percentage of words equal to alt text and/or description of the broken image. For example, if greater than or equal to 80% of words in alt text and/or description of an image are present in alt text and/or description of the broke image, the image may be identified as a replacement image.

If an image is identified as a replacement image (e.g., based on machine learning-identified similarities with the broken image) the replacement image is displayed in place of the broke image, as described above with reference to FIGS. 8-9.

As an illustrative example, FIG. 10 is a block diagram illustrating an example web page display 1000 of the web page 201 with a replacement resource 1005 displayed in place of the resource 205. That is, rather than display a broken image placeholder 305 and alternate text 307, which may negatively impact the user experience and the formatting of the web page 201 as discussed hereinabove with regard to FIGS. 2 and 3, the web page display 1000 displays the replacement resource 1005 with a same formatting as the original resource 205. Further, the replacement resource 1005 is a suitable replacement for the original resource 205 because the replacement resource 1005 is selected based on at least one overlapping keyword with the original resource 205, thereby improving the user experience by preventing web pages from loading with broken images.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the systems described above with respect to FIG. 1. The methods may be performed by executing stored instructions with one or more logic devices (e.g., processors) in combination with one or more hardware elements, such as storage devices, memory, hardware network interfaces/antennas, switches, actuators, clock circuits, and so on. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

The disclosure also provides support for a method, comprising: determining a link to a first resource in a web page is broken, automatically selecting a second resource, the second resource of a same type as the first resource, from a resource database to replace the first resource in the web page, updating the web page with a link to the second resource in place of the link to the first resource, and displaying the updated web page to a user. In a first example of the method, the method further comprises: identifying a keyword associated with the first resource, and automatically selecting the second resource responsive to the keyword associated with the second resource. In a second example of the method, optionally including the first example, the method further comprises: generating an resource metadata database including a plurality of resources and a plurality of alternate texts corresponding to the plurality of resources. In a third example of the method, optionally including one or both of the first and second examples, the method further comprises: automatically generating alternate text for a resource of the plurality of resources responsive to an absence of alternate text for the resource. In a fourth example of the method, optionally including one or more or each of the first through third examples, the method further comprises: generating a keyword database comprising a plurality of keywords extracted from the plurality of alternate texts. In a fifth example of the method, optionally including one or more or each of the first through fourth examples, the method further comprises: generating the resource database based on the resource metadata database and the keyword database. In a sixth example of the method, optionally including one or more or each of the first through fifth examples, determining the link to the first resource in the web page is broken comprises: transmitting a request for the first resource, and receiving, responsive to the request, an error message indicating the first resource is not found.

The disclosure also provides support for a computer-readable storage medium including an executable program stored thereon, the program configured to cause a computer to: determine a link to a first resource in a web page is broken, automatically select a second resource from a resource database to replace the first resource in the web page, update the web page with a link to the second resource in place of the link to the first resource, and output the updated web page for display to a user. In a first example of the system, the executable program is further configured to cause a computer processor to identify a keyword associated with the first resource, and automatically select the second resource responsive to the keyword associated with the second resource. In a second example of the system, optionally including the first example, the executable program is further configured to cause a computer processor to generate a resource metadata database including a plurality of resources and a plurality of alternate texts corresponding to the plurality of resources. In a third example of the system, optionally including one or both of the first and second examples, the executable program is further configured to cause a computer processor to automatically generate metadata for a resource of the plurality of resources responsive to an absence of metadata for the resource. In a fourth example of the system, optionally including one or more or each of the first through third examples, the executable program is further configured to cause a computer processor to generate a keyword database comprising a plurality of keywords extracted from the plurality of alternate texts. In a fifth example of the system, optionally including one or more or each of the first through fourth examples, the executable program is further configured to cause a computer processor to generate the resource database based on the resource metadata database and the keyword database. In a sixth example of the system, optionally including one or more or each of the first through fifth examples, determining the link to the first resource in the web page is broken comprises: transmitting a request for the first resource, and receiving, responsive to the request, an error message indicating the first resource is not found.

The disclosure also provides support for a system, comprising: a client system configured for a user, and a server communicatively coupled to the client system via a network, the server storing an image database and providing a web service that returns a web page to the client system responsive to receiving a request for the web page from the client system, wherein the client system is configured with executable instructions in non-transitory memory that when executed cause a processor of the client system to: determine a link to a first image in the web page is broken, automatically select a second image from the image database to replace the first image in the web page, update the web page with a link to the second image in place of the link to the first image, and display the updated web page to a user. In a first example of the system, the client system is further configured with executable instructions in the non-transitory memory that when executed cause the processor of the client system to: determine a linked non-image resource in the web page is broken, automatically determine a replacement resource for the linked non-image resource, and update the web page with a link for the replacement resource. In a second example of the system, optionally including the first example, the server is configured with executable instructions in non-transitory memory that when executed cause a processor of the server to: automatically select the second image in the image database according to one or more metadata attributes, the one or more metadata attributes comprising one or more of alternate text, image dimensions, a color space, a color profile, a title, a creation timestamp, a modification timestamp, a file type, a file size, an author, and a file name. In a third example of the system, optionally including one or both of the first and second examples, the server is further configured with executable instructions in the non-transitory memory of the server that when executed cause the processor of the server to: automatically select the second image according to the one or more metadata attributes based on a weighted ranking of metadata attributes. In a fourth example of the system, optionally including one or more or each of the first through third examples to determine the link to the first image in the web page is broken, the client system is further configured with executable instructions in the non-transitory memory that when executed cause the processor of the client system to: receive, from a second server communicatively coupled to the client system via the network, the second image. In a fifth example of the system, optionally including one or more or each of the first through fourth examples, the server is configured with executable instructions in non-transitory memory that when executed cause the server to match a replacement resource from a similar website based on a ranking algorithm.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," "third," and so on are used merely as labels, and are not intended to impose numerical requirements or a particular positional order on their objects. The following claims particularly point out subject matter from the above disclosure that is regarded as novel and non-obvious.

The invention claimed is:

1. A method, comprising:
responsive to a presence of a broken or missing resource in a first web page,
using a machine learning model to select a replacement resource for the broken or missing resource, wherein the machine learning model is a context-aware resource replacement model, and the machine learning model is trained to identify the replacement resource based on a similarity in patterns and/or identifying characteristics, wherein the identifying characteristics include one or more of objects and semantics, and wherein the identifying characteristics are identified by reading content surrounding the broken or missing resource, the content including one or more of text, other images, and links.

2. The method of claim 1, wherein the identifying characteristics include a topic of the first web page, the topic identified based on one or more of text, images, media, and metadata of articles displayed at the first web page.

3. The method of claim 1, wherein the replacement resource is located from one or more of a database of resources, a second web page of a website that includes the first web page, and credible websites.

4. The method of claim 1, wherein the replacement resource is located from a database of resources, and the database of resources includes one or more of open-access images and images of the website.

5. The method of claim 1, wherein the replacement resource is located from a second web page when the second web page includes at least one article referring to a similar topic as the first web page, and wherein the similar topic is identified based on one or more of text, images, media, and metadata of the at least one article.

6. The method of claim 1, wherein the replacement resource is located from credible websites, and the creditable websites are identified from a database of curated resources curated by one or more of a trusted third-party and an administrator of the website that includes the first web page, and/or the credible websites are identified based on an author or a publisher of the credible websites.

7. The method of claim 1, wherein the machine learning model is trained using a training set of resources, the training set of resources including a plurality of broken resources and a plurality of replacement resources associated with each of the plurality of broken resources, and wherein the machine learning model is trained to learn one or more of patterns and other identifying characteristics of a broken resource of the plurality of broken resources that are similarly represented in at least one replacement resource of the plurality of replacement resources.

8. The method of claim 1, wherein the machine learning model is trained using one or more of a training set of resources from web pages having a topic similar to a topic of the first web page, content surrounding the broken or missing resource, and resources having a similar meta tag.

9. The method of claim 1, wherein the machine learning model is a convolutional neural network trained to identify one or more keywords associated with the broken or missing resource.

10. The method of claim 9, further comprising using a natural language model to construct a natural language description of the broken or missing resource based on the identified one or more keywords.

11. The method of claim 1, further comprising using a visual identification technology in addition to the machine learning model to select the replacement resource.

12. A method for replacing broken resources in a website, comprising:
automatically creating metadata for identified resources of the website using a deep learning model, the identified resources determined to be missing metadata;
saving the created metadata to a database configured to store metadata for all resources of the website;
in response to identification of a first broken or missing resource having metadata overlapping with at least one entry of the database, replacing the first broken or missing resource by selecting an alternate resource corresponding to the at least one entry; and
in response to identification of a second broken or missing resource having a lack of overlap between metadata of the second broken or missing resource and the at least one entry of the database, automatically generating a replacement resource using machine learning.

13. The method of claim 12, wherein the identified resources of the website include images, text, videos, multimedia files, and services.

14. The method of claim 12, wherein using machine learning includes using a technology trained to identify the replacement resource based on patterns and/or characteristics of the second broken or missing resource and scanning an open-access database for the replacement resource.

15. The method of claim 12, wherein using machine learning includes using a trained machine learning model to identify the replacement resource based on similarity between meta tags of the second broken or missing resource and of the replacement resource, the meta tags including one or more of width, height, alternate text, and description.

16. The method of claim 12, wherein the deep learning model is a trained image classifier configured to process the identified resources to identify one or more keywords associated with the identified resources.

17. The method of claim 12, wherein the deep learning model includes a natural language model configured to construct natural language descriptions of the identified resources based on identification of keywords associated with the identified resources.

18. The method of claim 12, wherein the automatically created metadata for the identified resources is alternate text.

19. A method, comprising:
responsive to a presence of a broken or missing resource in a first web page,
using a machine learning model to select a replacement resource for the broken or missing resource, wherein the machine learning model is a convolutional neural network trained to identify one or more keywords associated with the broken or missing resource, and the machine learning model is trained to identify the replacement resource based on a similarity in patterns and/or identifying characteristics; and
using a natural language model to construct a natural language description of the broken or missing resource based on the identified one or more keywords.

\* \* \* \* \*